(12) United States Patent
Jones et al.

(10) Patent No.: US 7,055,662 B1
(45) Date of Patent: Jun. 6, 2006

(54) VEHICLE AXLE BEAM AND BRAKE ASSEMBLY

(75) Inventors: Jeffrey Lee Jones, Battle Creek, MI (US); Daniel E. Brooks, Climaz, MI (US); James Robert Clark, Plainwell, MI (US); Carl Heinz Meyer, Portage, MI (US)

(73) Assignee: Dana Corporation, Toledo, OH (US)

( * ) Notice: Subject to any disclaimer, the term of this patent is extended or adjusted under 35 U.S.C. 154(b) by 800 days.

(21) Appl. No.: 09/471,153

(22) Filed: Dec. 23, 1999

(51) Int. Cl.
*F16D 51/00* (2006.01)
(52) U.S. Cl. ..................................... 188/341; 188/329
(58) Field of Classification Search ............... 188/361, 188/362, 340, 341, 329, 330, 332
See application file for complete search history.

(56) References Cited

U.S. PATENT DOCUMENTS

| | | | | |
|---|---|---|---|---|
| 3,279,569 A | * | 10/1966 | Kieser et al. | 188/206 A |
| 3,497,037 A | * | 2/1970 | Deibel | 188/329 |
| 4,337,851 A | * | 7/1982 | Pringle | 188/330 |
| 4,445,597 A | * | 5/1984 | Baltare | 188/206 A |
| 4,452,347 A | * | 6/1984 | Dozier | 188/330 |
| 4,476,968 A | * | 10/1984 | Urban et al. | 188/329 |
| 4,526,254 A | * | 7/1985 | Baltare | 188/341 |
| 4,854,427 A | * | 8/1989 | Baroni | 188/205 R |
| 4,858,729 A | * | 8/1989 | Crewson et al. | 188/205 R |
| 4,858,730 A | * | 8/1989 | Baroni | 188/205 R |
| 5,044,475 A | * | 9/1991 | Clark | 188/329 |
| 5,325,945 A | * | 7/1994 | Walker | 188/341 |
| 5,649,612 A | * | 7/1997 | Walker et al. | 188/329 |
| 5,695,025 A | * | 12/1997 | White | 188/78 |
| 5,887,687 A | * | 3/1999 | Williams | 188/330 |
| 6,240,806 B1 | * | 6/2001 | Morris et al. | 74/567 |

FOREIGN PATENT DOCUMENTS

WO     WO 01/46600 A1 * 12/2000

* cited by examiner

*Primary Examiner*—Xuan Lan Nguyen
(74) *Attorney, Agent, or Firm*—Berenato, White & Stavish

(57) ABSTRACT

An improved axle beam and self-contained drum brake assembly, particularly for heavy duty trucks, is disclosed. The assembly includes a brake spider and actuating members mounted thereto via a mounting assembly comprising a mounting sleeve attached to the brake spider by means of a second mounting bracket, and a first mounting bracket securing a pneumatic brake actuator cylinder to the mounting sleeve. A brake actuating camshaft is positioned and rotationally supported therewithin. The disclosed brake assembly allows for numerous variations of axle beam and suspension arrangements.

5 Claims, 4 Drawing Sheets

VEHICLE AXLE BEAM AND BRAKE ASSEMBLY

BACKGROUND OF THE INVENTION

1. Field of the Invention

The present invention relates to a drum brake arrangement for motor vehicles in general, and particularly to a novel arrangement of various components of a pneumatically actuated drum brake assembly for rear axles of heavy duty trucks.

2. Description of the Prior Art

Pneumatically actuated drum brakes are well known in the prior art. Typically, a pneumatically actuated drum brake assembly includes a brake spider bolted to a flange on an axle beam. The brake spider is adapted to support a pair of brake shoes. A brake actuator shaft provided with an S-cam at one end and a pneumatic actuator at the other end, is normally supported on the axle beam by at least one bracket welded to the axle beam. This conventional design renders current pneumatically actuated drum brake assemblies quite complex in manufacturing, cumbersome, expensive and require a great deal of changes in the current production in order to accommodate numerous variations of axle beams and suspension arrangements.

SUMMARY OF THE INVENTION

The present invention provides an improved pneumatically actuated drum brake assembly, especially for rear axles of heavy duty trucks. The brake assembly of the present invention comprises a brake spider secured to an axle beam preferably by welding to support all other components of the brake assembly. The brake spider includes a pivoting end support plate having one or more anchor pin bores, and an actuator support plate disposed substantially opposite to the pivoting end support plate. A pair of brake shoes is pivotally supported by anchor pin mounted within the anchor pin bore in the pivoting end support plate and is actuated by an S-cam fixed to a second end of a brake actuating shaft. The actuating shaft in turn is actuated by a pneumatic brake actuator. The present invention employs a mounting assembly that secures the pneumatic brake actuator and brake actuating shaft with the S-cam directly to the brake spider that allows to assemble the brake assembly as a module and use the same brake assembly for numerous variations of axle beams and suspension arrangements.

BRIEF DESCRIPTION OF THE DRAWINGS

Other objects and advantages of the invention will become apparent from a study of the following specification when viewed in light of the accompanying drawings, wherein.

DETAILED DESCRIPTION

Figure 1:
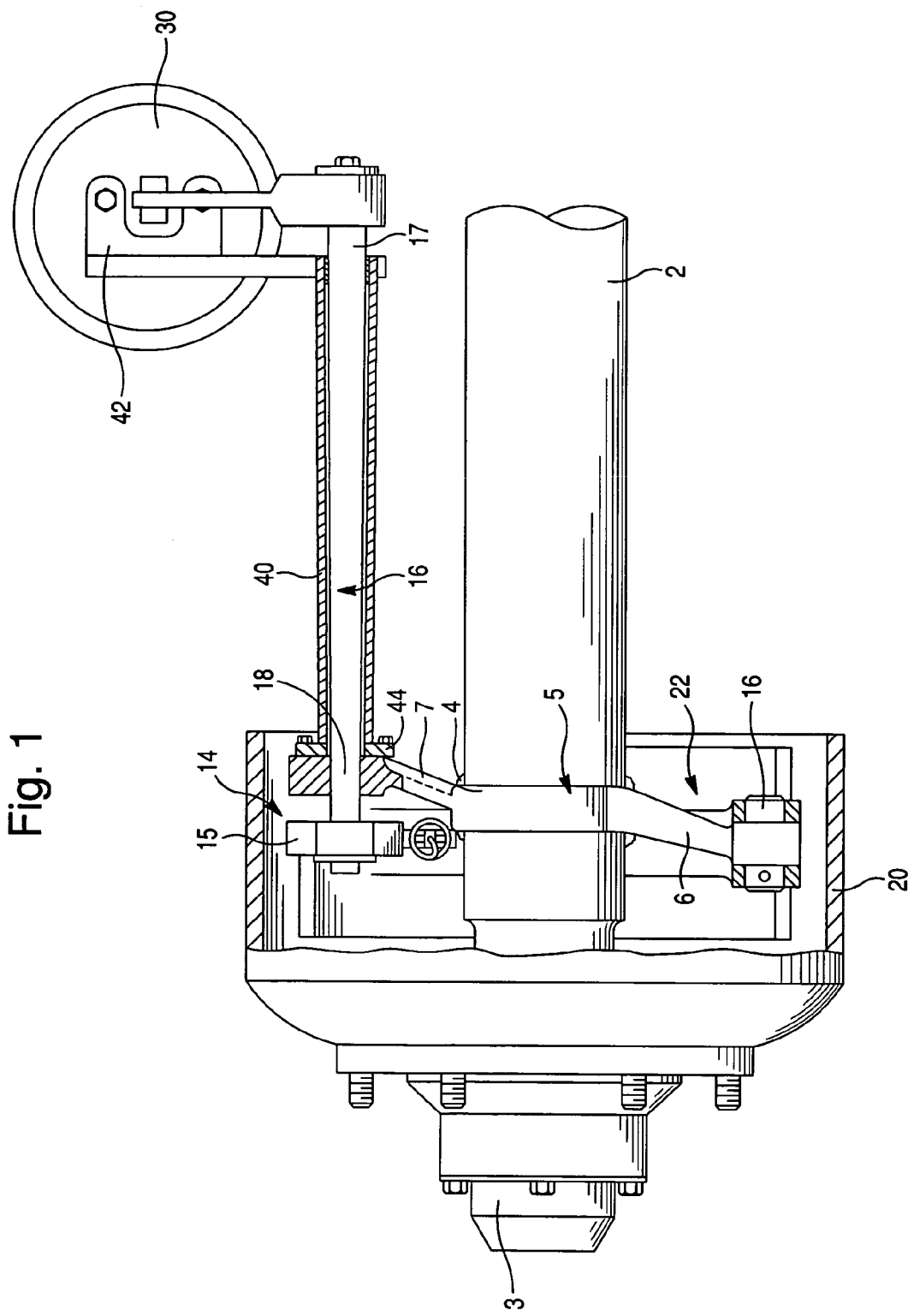
FIG. 1 is a cross-sectional view of the brake assembly in accordance with the present invention.
Figure 2:
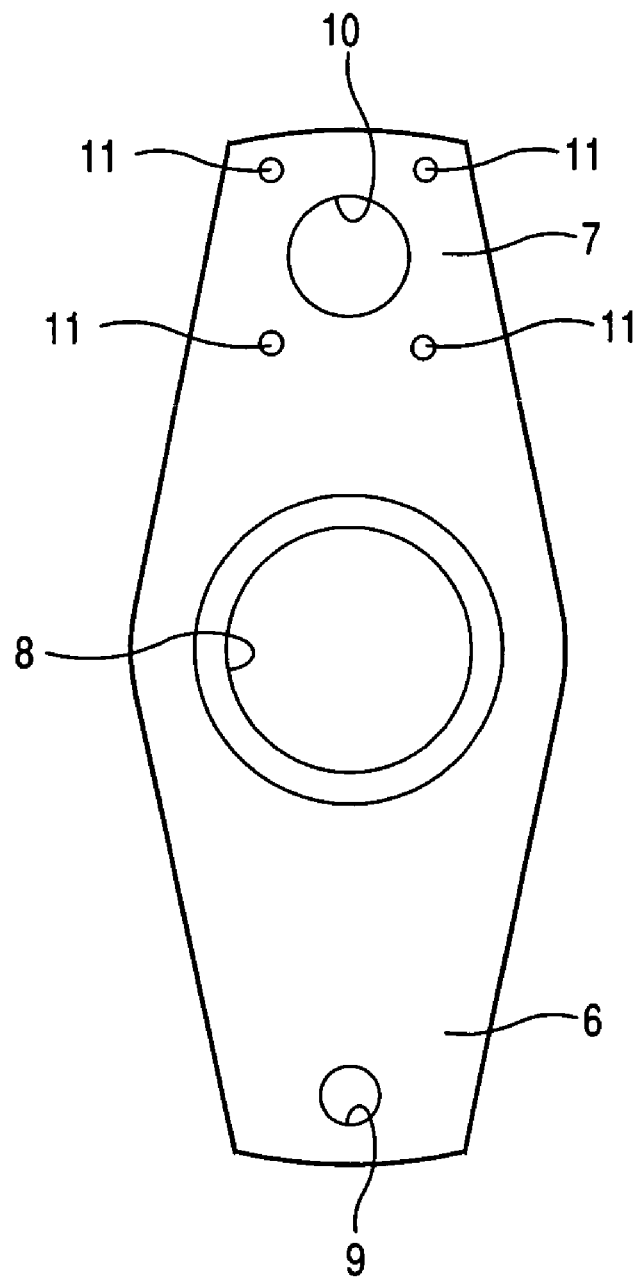
FIG. 2 is a side view of the brake spider.

FIG. 1 of the drawings depicts a novel arrangement of a pneumatically actuated drum brake assembly of the present invention adapted to be utilized for heavy duty trucks. Reference numeral 2 defines an axle beam including a spindle 3 rotatably supporting a wheel (not shown). A brake spider 5 is non-removably secured to the axle beam 2, preferably by welding. The welding joint between the axle beam 2 and the brake spider 5 is indicated generally by reference numeral 4. The brake spider, illustrated in FIG. 2, comprises a pivoting end support plate 6 and an actuator support plate 7 extending generally opposite to the pivoting end support plate 6, and defines a central aperture 8 through which the axle beam 2 is positioned.

The brake assembly includes a brake drum 20 mounted to a wheel hub (not shown) which is rotatably mounted on the spindle 3. The brake assembly utilizes a pair of brake shoes 22 each including a pair of axially spaced webs 23.

In order to selectively move the brake shoes 22 outwardly to create frictional engagement with the interior of the brake drum 20, a rotary actuator 14 is provided. The rotary actuator 14 includes a brake actuating shaft 16 having a first end 17 and a second end 18, and an S-cam 15 rigidly secured to the second end 18 of the actuating shaft 16 by any appropriate means well known in the brake art, such as spline connection. The second end 18 of the actuator shaft 16 extends through a support opening 10 in the actuator support plate 7 of the brake spider 5. The support opening 10 may be provided with any form of bushing or bearing well known in the prior art to allow free rotation of the actuator shaft 16.

The rotary actuator 14 is actuated by a pneumatic actuator including a pneumatic actuator cylinder 30 provided with an actuator rod 32 extending therefrom. A distal end of the actuator rod 32 is pivotally connected to one end of a brake actuating lever 34. The other end of the brake actuating lever 34 is fixedly secured to the first end of the actuator shaft 16 by any appropriate means well known in the brake art.

The actuator shaft 16 is actuated by the pneumatic actuator cylinder 30 to cause the cam 15 to rotate outwardly displacing the brake shoes 22 for braking engagement with the interior surface of the drum 20. Each of the brake shoes 22 commonly includes a cam follower 26 at an end 25 thereof adjacent to the cam 15 to allow smooth application of the force generated by the rotation of the cam 15 to each brake shoe 22.

Figure 3:
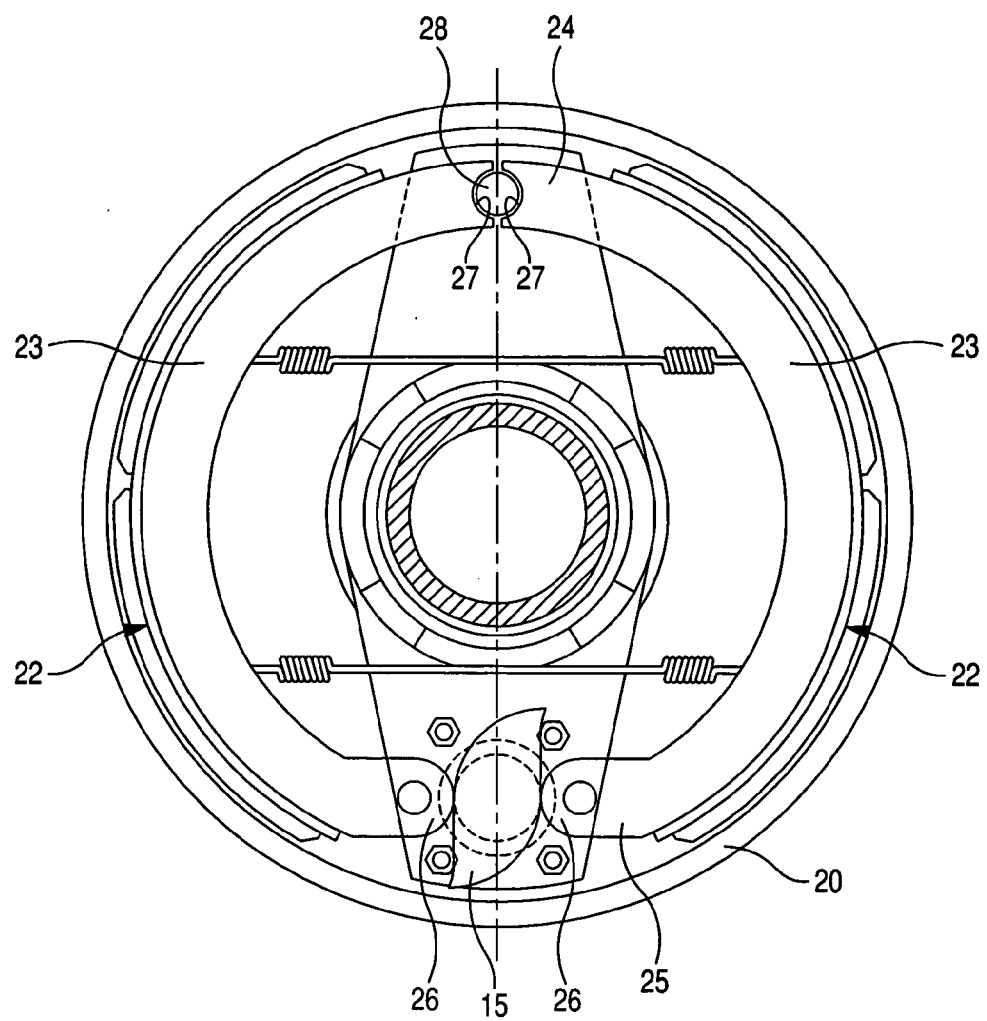
FIG. 3 is a partially sectioned front view of the brake assembly.

An end 24 of the brake shoe 22, as illustrated in FIG. 3, is designed to be supported for pivotal movement in response to the outward movement of the end 25 of the brake shoe 22 as it is selectively moved by the cam 15. The end 24 of each shoe 22 is provided with an open recess 27 in the shoe web 23 designed to receive a pivot pin 28.

It should be noted that the brake spider 5 of the present invention utilizes a single centrally located pivot pin 28 to support both brake shoes, as disclosed hereinabove. However, there are some drum brake configurations in the prior art that employ a pair of pivot pins for supporting one end of each brake shoe. It will be clear to those skilled in the art that the present invention could readily be employed for such brake assemblies. Although the specific forces acting on each plate of the brake spider might be different, there is sufficient information provided hereinabove to enable one with ordinary skills in the art to design such a brake spider without departing from the scope of the invention.

Figure 4:
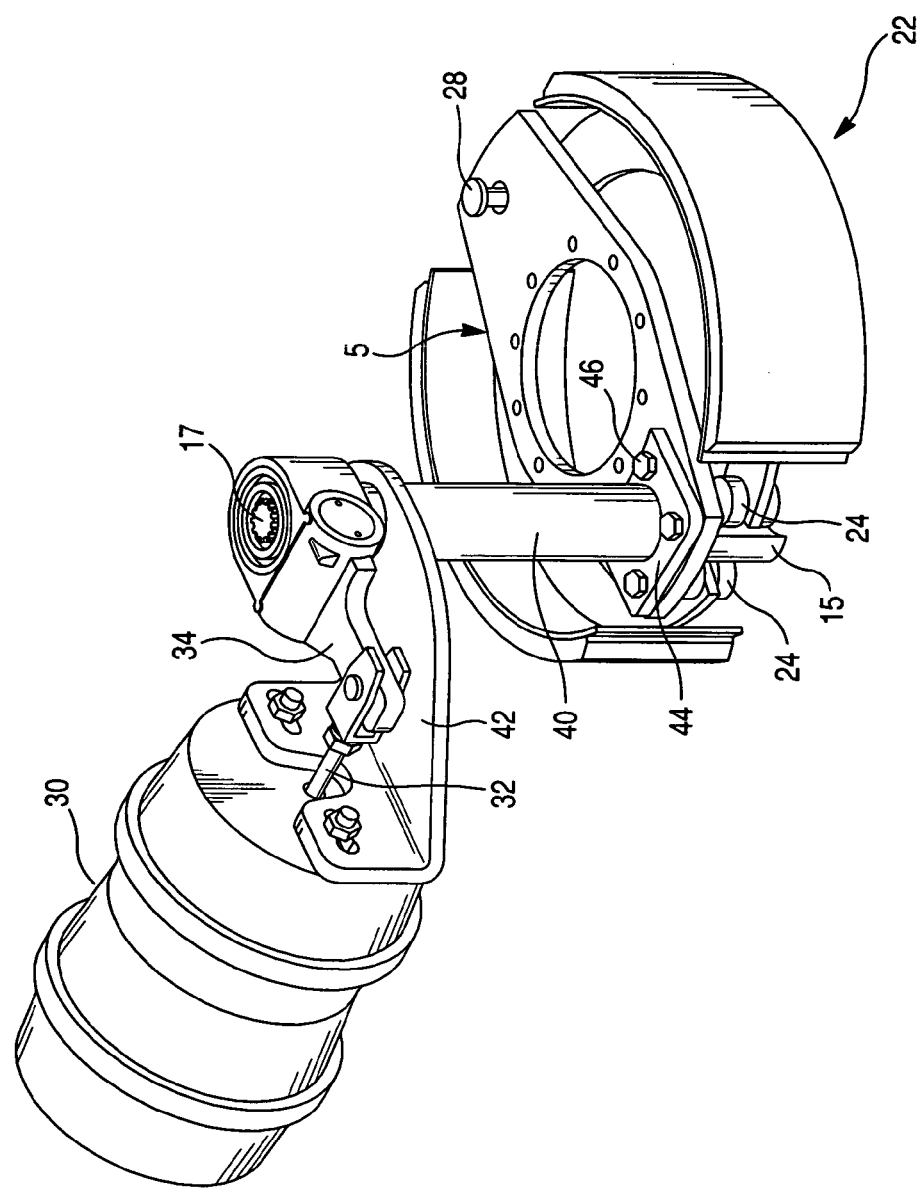
FIG. 4 is a perspective view of the brake assembly in accordance with the present invention.

As illustrated in FIGS. 1 and 4, the present invention includes a mounting assembly that secures the pneumatic brake actuator cylinder 30 and rotary actuator 14 directly to the brake spider 5. The mounting assembly includes a mounting sleeve 40 for positioning and rotationally supporting the actuating shaft 16 therewithin. The mounting sleeve 40 may be of any length depending on the vehicle and applicable clearance space. The mounting sleeve is provided with a first mounting bracket 42 at one end, and a second mounting bracket 44 at the other end. The first and second mounting brackets 42 and 44 respectively, are secured to the mounting sleeve by any appropriate means, preferably by welding. The first mounting bracket 42 is used to secure the pneumatic actuator cylinder 30. In turn, the second mounting bracket 44 is fastened to the brake spider 5 by bolts 46 through apertures 11 in the actuator support plate 7 of the brake spider 5. Thus, a self-contained brake assembly is provided that is easy to assemble and allows for numerous variations of axle beams and suspension arrangements.

It is to be understood that while the brake assembly disclosed herein is disclosed in the context of a pneumatic actuator, other actuating mechanisms well known in the prior art, such as hydraulic, mechanical, electrical, etc., may be employed.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiment disclosed hereinabove was chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A vehicle axle beam and drum brake assembly, comprising:
   a pneumatic brake actuator cylinder provided with an actuator rod extending therefrom, said pneumatic brake actuator cylinder being solely supported by a brake spider;
   a brake actuating shaft having a first end and a second end;
   a brake actuating lever interconnecting said actuator rod and said first end of said brake actuating shaft;
   an S-cam secured to said second end of said brake actuating shaft;
   said brake spider non-removably secured to said axle beam to support a brake assembly, said brake spider including a pivoting end support plate and an actuator support plate provided with an opening for receiving said brake actuating shaft therethrough;
   a mounting sleeve having a first end and a second end, said first end of said mounting sleeve is secured to said pneumatic brake actuator cylinder and said second end of said mounting sleeve is secured to said actuator support plate of said brake spider, said brake actuating shaft rotationally supported and positioned within said mounting sleeve;
   a pair of brake shoes pivotally supported on said pivoting end support plate of said brake spider, said brake shoes adapted to frictionally engage a bearing surface of a brake drum; and
   a cam follower secured on each of said shoes and adapted to interfit with an outer surface of said S-cam,
   wherein when said actuator rod is extended, said brake actuating shaft and said S-cam rotate about the longitudinal axis such that said brake shoes are brought into frictional engagement with said bearing surface.

2. The vehicle axle beam and drum brake assembly as defined in claim 1, further comprising:
   a first mounting bracket attached to said first end of said mounting sleeve; and
   a second mounting bracket attached to said second end of said mounting sleeve.

3. The vehicle axle beam and drum brake assembly as defined in claim 2, wherein said first mounting bracket is fastened to said pneumatic brake actuator cylinder.

4. The vehicle axle beam and drum brake assembly as defined in claim 2, wherein said second mounting bracket is fastened to said actuator support plate of said brake spider.

5. A vehicle axle beam and drum brake assembly, comprising:
   a pneumatic brake actuator cylinder provided with an actuator rod extending therefrom, said pneumatic brake actuator cylinder being solely supported by a brake spider;
   a brake actuating shaft having a first end and a second end;
   a brake actuating lever interconnecting said actuator rod and said first end of said brake actuating shaft;
   an S-cam secured to said second end of said brake actuating shaft;
   said brake spider welded to said axle beam to support a brake assembly, said brake spider including a pivoting end support plate and an actuator support plate provided with an opening for receiving said brake actuating shaft therethrough, said actuator support plate being axially offset from said pivoting end support plate;
   a mounting sleeve having a first end and a second end, said first end of said mounting sleeve is secured to said pneumatic brake actuator cylinder and said second end of said mounting sleeve is secured to said actuator support plate of said brake spider, said brake actuating shaft rotationally supported and positioned within said mounting sleeve;
   a first mounting bracket attached to said first end of said mounting sleeve, said first mounting bracket is fastened to said pneumatic brake actuator cylinder;
   a second mounting bracket attached to said second end of said mounting sleeve, said second mounting bracket is fastened to said actuator support plate of said brake spider;
   a pair of brake shoes pivotally supported on said pivoting end support plate of said brake spider, said brake shoes adapted to frictionally engage a bearing surface of a brake drum; and
   a cam follower secured on each of said shoes and adapted to interfit with an outer surface of said S-cam,
   wherein when said actuator rod is extended, said brake actuating shaft and said S-cam rotate about the longitudinal axis such that said brake shoes are brought into frictional engagement with said bearing surface.

\* \* \* \* \*

UNITED STATES PATENT AND TRADEMARK OFFICE
CERTIFICATE OF CORRECTION

PATENT NO. : 7,055,662 B1 Page 1 of 1
APPLICATION NO. : 09/471153
DATED : June 6, 2006
INVENTOR(S) : Jones et al.

It is certified that error appears in the above-identified patent and that said Letters Patent is hereby corrected as shown below:

On the title page item (75), should read

Jeffrey Lee Jones, Battle Creek, MI (US);

Daniel E. Banks, Climax, MI (US);

James Robert Clark, Plainwell, MI (US);

Carl Heinz Meyer, Portage, MI (US)

Signed and Sealed this

Tenth Day of October, 2006

JON W. DUDAS
*Director of the United States Patent and Trademark Office*